United States Patent [19]

Mayeux

[11] 4,153,838

[45] May 8, 1979

[54] SCINTILLATION-TYPE X-RAY DETECTOR AND RADIOLOGY APPARATUS INCORPORATING SUCH DETECTOR

[75] Inventor: Christian Mayeux, Paris, France

[73] Assignee: Compagnie Generale de Radiologie, Paris, France

[21] Appl. No.: 851,922

[22] Filed: Nov. 16, 1977

[30] Foreign Application Priority Data

Nov. 26, 1976 [FR] France .................................. 76 35751

[51] Int. Cl.$^2$ .............................................. G01T 1/20
[52] U.S. Cl. .................................................. 250/368
[58] Field of Search ............ 250/361 R, 363 R, 363 S, 250/366, 367, 368, 445 T

[56] References Cited

U.S. PATENT DOCUMENTS 3,866,047  2/1975  Hounsfield ....................... 250/445 T Primary Examiner—Davis L. Willis
Attorney, Agent, or Firm—Edwin E. Greigg

[57] ABSTRACT

A radiological apparatus, especially for the examination of objects by tomographic scanning, and equipped with a plurality of X-ray detectors. Each detector includes a scintillator crystal which is coupled to a photomultiplier by a light collector. The light collector is shaped in such way that all or a substantial majority of the light emitted by the scintillator crystal is reflected into the photomultiplier. In particular, the surface of the collector is made reflecting and the various portions of the reflecting surface are configured to reflect light emerging from a corresponding crystal face in a direction which misses the scintillation crystal and which permits entry in the photomultiplier tube. Various embodiments are presented wherein the surface is composed of circular, parabolic and polygonal cylinders.

10 Claims, 10 Drawing Figures

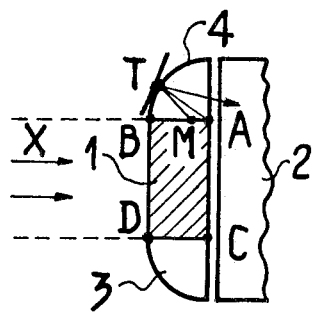
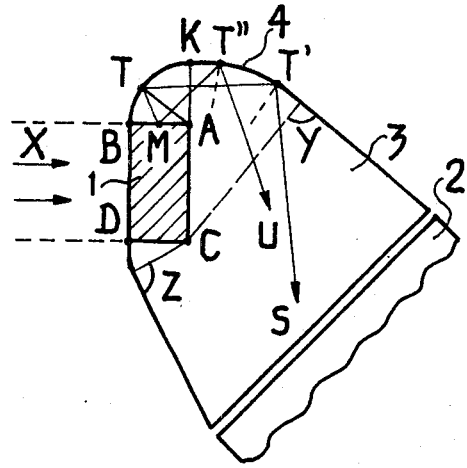
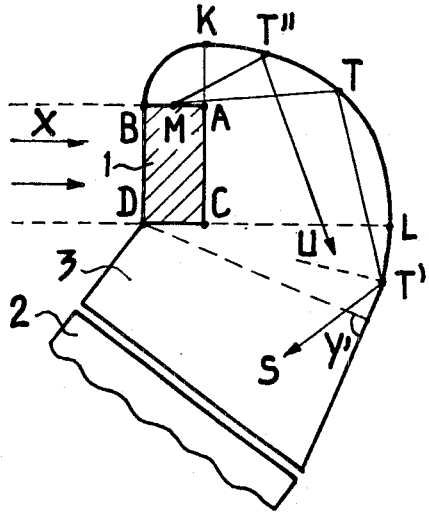
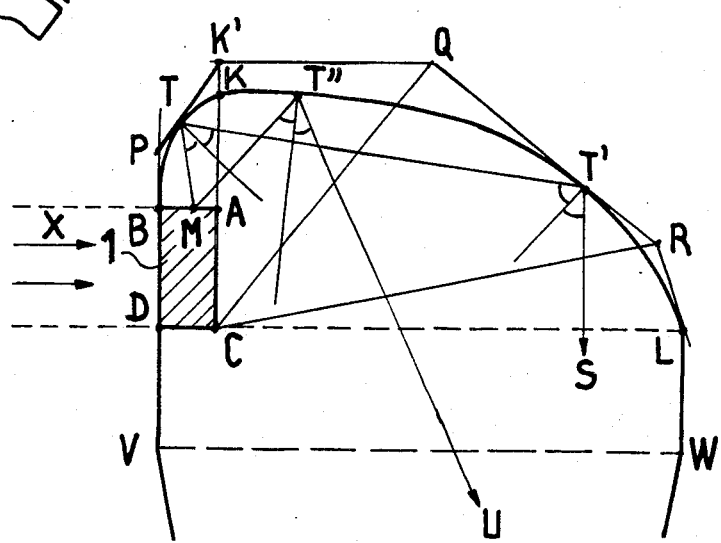

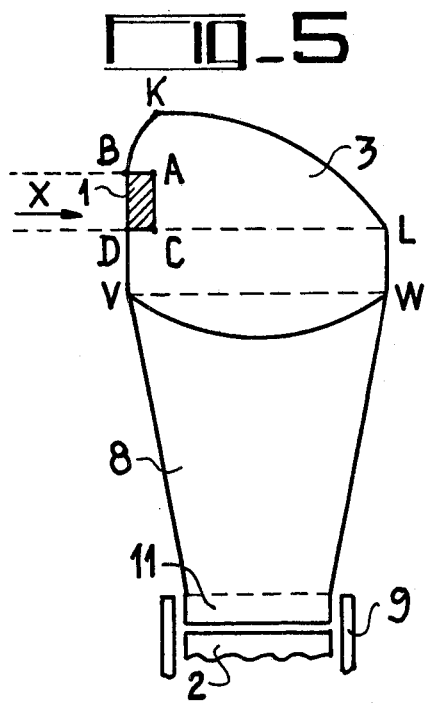
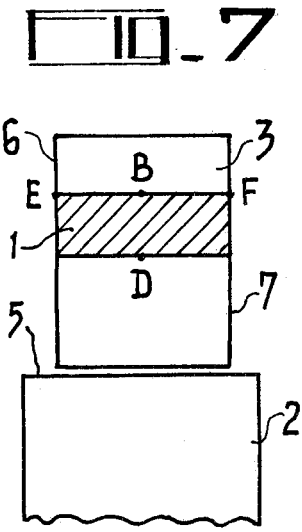
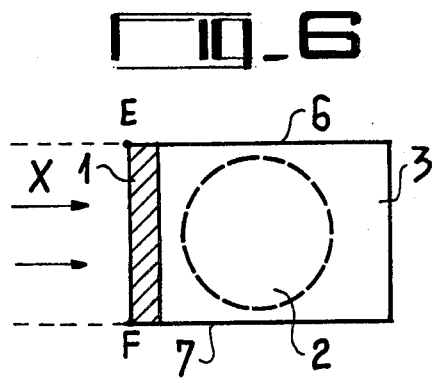
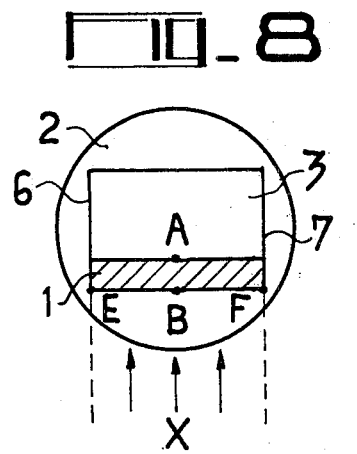
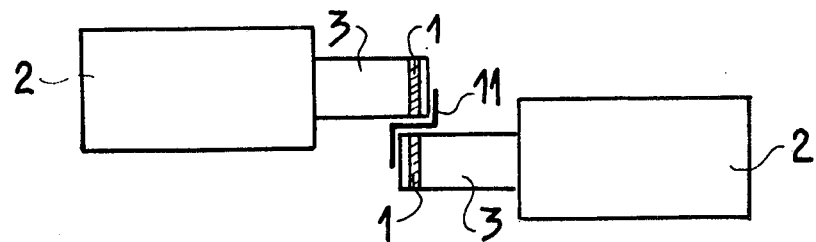

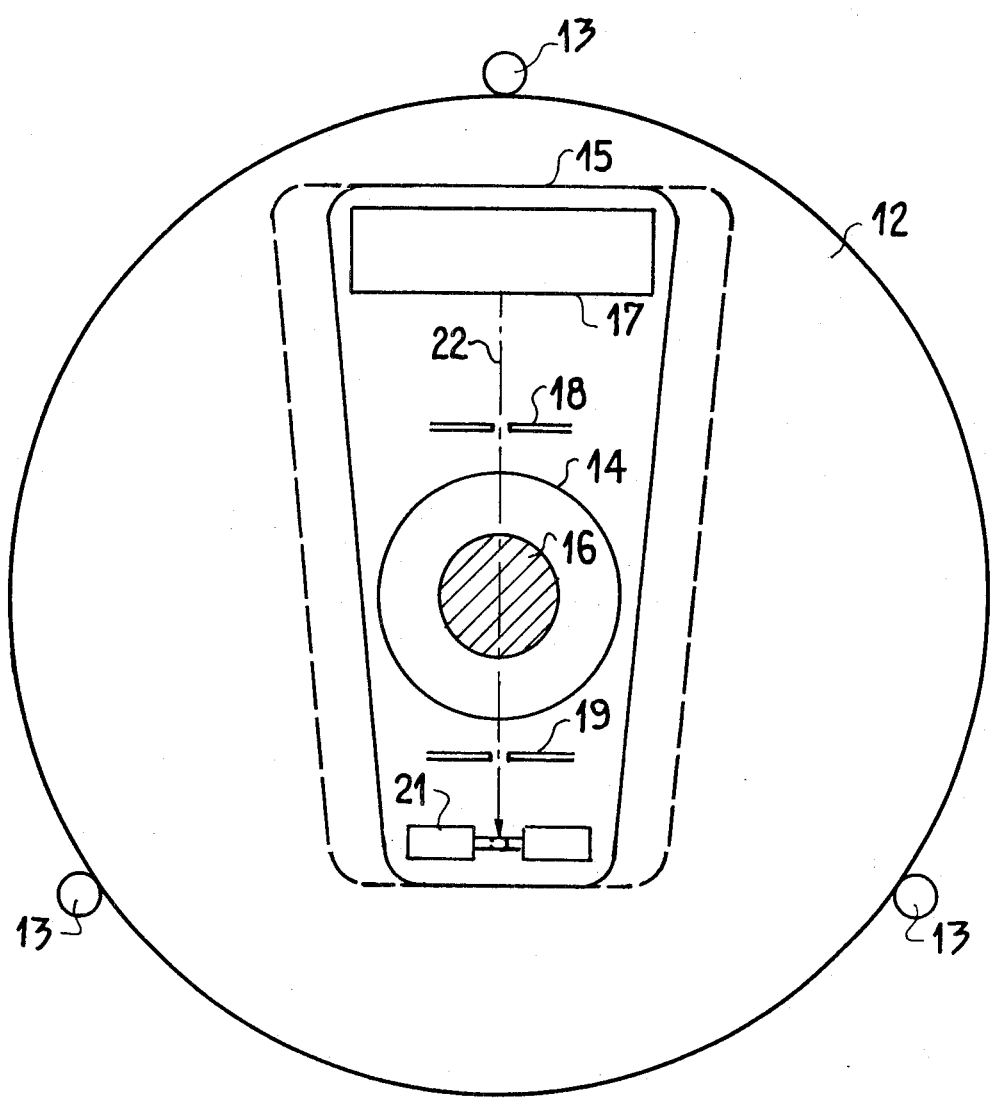

SCINTILLATION-TYPE X-RAY DETECTOR AND RADIOLOGY APPARATUS INCORPORATING SUCH DETECTOR

BACKGROUND OF THE INVENTION

This invention relates to a scintillation-type x-ray detector and to radiology apparatus employing such detectors. In certain kinds of present-day radiology apparatus, the direct imprinting of a photographic film is replaced by detection of the quantity of x-rays received at points, this detection resulting in an electrical signal which is characteristic of each point. These signals are then processed by computer to reconstitute an image.

This procedure requires that the x-ray beam be scanned and its intensity be measured at instants, which consequently necessitates mechanical equipment which becomes larger as the size of the moving parts such as the detector become larger.

One object of the invention is to provide a detector of small bulk which is nevertheless of high sensitivity.

There exist a number of kinds of x-ray detectors which employ either an ionization chamber, or photoconductive cells, or scintillation crystals.

The detector according to the invention employs a scintillator crystal which emits light in response to x-ray photons, which light is transmitted to a photomultiplier via a light collector.

The x-ray photons pass through the crystal and some of them are absorbed by the crystal. At the point at which it is absorbed by the crystal, each x-ray photon which is absorbed produces a number of light photons which are emitted in all directions. These, before they reach the surface, follow a path within the crystal whose length varies according to the direction in which they are emitted. Only a portion of the photons which strike a surface emerge, the others being reflected into the interior of the crystal where they follow one or more other paths. This portion is a function in particular of the respective refractive indices of the crystal and the medium adjacent to it, and of the state of the said surface.

The material used for the scintillator crystal thus needs to exhibit high absorption for the x-ray photons to be detected, a high quantum yield, low optical absorption for the emitted photons, and short persistence since the variations over time are considerable. Materials which are particularly suitable are calcium tungstate ($CaWO_4$), bismuth germanate [$Bi_4(G_e O_4)_3$] and oxygen-doped zinc telluride ($Zn Te : O$).

The shape of the scintillating crystal is dictated by the following considerations: The entry area for the x-ray photons corresponds to the cross section of the x-ray beam to be detected. The crystal therefore has an entry area which is slightly larger in size than the x-ray beam, to avoid any lining-up difficulties, and only its thickness has to be optimized. The thickness is selected in such a way that the number of light photons which emerge from the crystal is a maximum for a given number of incident x-ray photons, taking into account, as explained above, the absorption of the x-rays, which should be a maximum, the absorption of the light photons, which should be a minimum, and the portion of light photons which are reflected from the faces into the interior of the crystal instead of emerging.

The shape of the crystal having been established in this way, it is necessary that the maximum number of light photons emerging from the crystal should pass through the window of the photomultiplier instead of being reflected when reaching the crystal/photomultiplier interface. The latter is generally coupled to the crystal by a coupler or collector. The function of the latter is to conduct light from the crystal to the photomultiplier while allowing for the difference in size between the two. In addition, so that the minimum amount of light shall be reflected at the interfaces, the refractive index of the material forming the coupler is selected to be as close as possible to the square root of the product of the index of the crystal multiplied by the index of the entry window of the photomultiplier.

The entry face of the crystal is covered with a thin reflective layer so that light rays which attempt to emerge from this face are thus reflected toward the opposite face through the crystal, the layer in question being permeable to x-ray photons.

These arrangements give rise to a certain number of disadvantages in the case of radiology apparatus having movable detectors.

Firstly, they do not enable the radiation emitted by the side-faces of the crystal to be reflected to the photomultiplier. The radiation which is lost in this way causes a corresponding reduction in the sensitivity of the detector since not all the light photons produced by the absorption of the x-ray photons are measured. This is particularly awkward in the case of radiological apparatus equipped with a number of detectors which are small but nevertheless need to be of high sensitivity.

To overcome this disadvantage, the light photons emitted by at least a portion of the side faces of the crystal are diverted back to the photomultiplier by reflection at reflective surfaces. The position and shape of these surfaces have to be such that they are unable to divert light onto the crystal whatever the direction of the rays likely to strike them.

The detector according to the invention, which is formed by a scintillator crystal which receives a beam of x-rays from a source and which transmits the light rays which are emitted in response to the x-rays which pass through it to a photomultiplier, is chiefly characterized by the fact that at least a portion of the light radiation which is emitted by the crystal and which does not impinge on the photomultiplier directly, is diverted toward the latter by reflection at a reflective surface whose intersection with a plane containing the x-ray beam and the photomultiplier is a curve whose evolute is external or tangent to the outline of the crystal in the said plane.

Another disadvantage is the space taken up by the photomultiplier in the direction of the x-ray beam, which makes it impossible to juxtapose the scintillator crystals of a plurality of detectors positioned side-by-side.

To remedy this, the photomultiplier is arranged obliquely to the direction of the x-ray beam which impinges on the crystal, at an angle which may vary from one detector to the next. The reflective surfaces are arranged in such a way that the photons emerging from those faces of the crystal which are not situated facing the photomultiplier are diverted toward the latter.

In accordance with another feature of the invention the crystal, which has a plurality of faces, is coupled to the photomultiplier by a collector which is formed from a transparent material which receives the light radiation emitted by the crystal, the said collector being covered with a reflective layer which diverts light back into the interior, the said photomultiplier being situated in a direction which is oblique with respect to the direction of the beam, the outline of the reflective surfaces in the plane containing the x-ray beam and the photomultiplier being a curve made up of a plurality of segments each corresponding to one face of the crystal and each connecting up with the neighboring segment, the reflective surfaces defined by each segment receiving both the light emitted by the crystal and the light reflected by the surfaces defined by adjoining segments, and reflecting the light in the direction of the photomultiplier and in the direction of the surfaces defined by adjoining segments.

Other features will become apparent in the course of the description of particular embodiments which is given below, and from the appended drawings.

BRIEF DESCRIPTION OF THE DRAWINGS

FIG. 1 is a cross section of a detector head according to the invention;

FIGS. 2 and 3 are cross sections of detector heads having oblique photomultipliers;

FIG. 4 is a cross section of a detector head having an orthogonal photomultiplier;

FIG. 5 is a cross section of a detector;

FIG. 6 is a view from above of the previous detector;

FIG. 7 is a front view of another type of detector;

FIG. 8 is a view from above of the previous detector;

FIG. 9 is a front view of an arrangement consisting of two detectors; and

FIG. 10 is a schematic view of a radiology apparatus employing one or two detectors according to the invention.

DESCRIPTION OF THE PREFERRED EMBODIMENTS

In FIG. 1 can be seen a cross section of a detecting head made up of a scintillator crystal 1 which is bound by two substantially parallel faces AC and BD. A photomultiplier 2 is adjacent the crystal. The crystal may be of parallelepiped or cylindrical shape and may resemble a lozenge in appearance.

According to the invention, the crystal is surrounded by a transparent collector 3 which adjoins both the crystal and the photomultiplier 2. Its outer face 4 is covered with a reflective layer. The shape of this outer face is such that a light ray MT emerging from a point M anywhere on a side face of the crystal 1 is reflected at T toward the photomultiplier. It can be seen that, if the reflected ray is never to strike the face AB of the crystal, it is necessary that no line normal at any point to the surface of the reflective layer 4 should intersect face AB, or in other words, the evolute of the surface should lie outside the crystal. The shape adopted in the present embodiment for the reflective layer 4 is an arc of a circle whose center is A and whose radius iss AB, but it is understood that any other form of curve would be satisfactory provided it meets the condition stated above.

It can be seen that with the configuration described, the photomultiplier 2 receives the light emitted by each of the faces AB and CD in addition to the light emitted by face AC of the scintillator. The sensitivity of the detector is thus improved.

Such a detector has the drawback of being of considerable bulk along the axis of the x-ray beam.

An important advantage of the invention is that it enables the photomultiplier to be positioned with an angular displacement from the direction of the x-ray beam without its sensitivity being affected.

FIG. 2 is a schematic cross-section of a detector head so arranged. In it can be seen a scintillator crystal ABCD whose face BD, which receives an x-ray beam defined by broken lines passing through B and D which travels in the direction indicated by the arrows, is covered with a layer which reflects light photons but is permeable to x-rays.

Except over the face BD which is directly exposed to the x-rays, the scintillator 1 is surrounded by a transparent collector or coupler 3. The latter is covered with a reflective layer 4, generally of aluminum, in such a way that any radiation which impinges on its inner surface from the interior is diverted back into the interior of the coupler and does not emerge from it. This arrangement, in which the material of the coupler is not exposed to the x-rays since virtually all of the x-rays are absorbed by the scintillator crystal, has the advantage of protecting the said material from the ill effects of premature aging due to exposure to x-rays.

In the present case, the photomultiplier 2 is situated obliquely to the direction of the x-ray beam at an obtuse angle. The curve which defines the outline of the edges of the collector which form the reflective surfaces is divided into segments BK, KY, DZ corresponding to faces BA, AC and DC, respectively, of the crystal. In the present embodiment, these segments are arcs of circles of center A and radius AB in the case of segment BK, of center C and radius CK in the case of segment KY, and of center C and radius CD in the case of segment DZ. These segments of curve, which are formed in the present case by arcs of circles, are bounded on one side by the plane of a face (B in the case of face BA, D in the case of face CD and K in the case of face AC) and on the other side by the adjoining segment. Surface ZCY is connected to the photomultiplier 2 by a truncated cone. The points Z and Y are selected in such a way that at these points a line normal to the generatrices passes through, or clear of, the edge C of the crystal. It can be seen that anywhere along this curve the normals are tangent to or lie ouside the crystal. The result is that light emitted in any direction by a point M lying on one face of the crystal is reflected to the photomultiplier either by two reflections at the surfaces corresponding to segments BK and KY, or by one reflection at the surface corresponding to segment KY, as is shown in the Figure by the paths of rays MTT′S and MT″U.

FIG. 3 shows a modification of the previous embodiment in which the direction of the photomultiplier forms an acute angle with the direction of beam X. The curve representing the outline of the collector in the sectional plane is in this case made up of an arc BK of a circle of center A and radius AB, an arc KL of a circle of center C and radius CK, and an arc LY′ of a circle of center D and radius DL. The ray-path which is indicated in FIG. 3 for a point M on face AB is similar to that described previously in the case of FIG. 2 (MT″U after one reflection at surface KL and MTT′S after two reflections at surfaces KL and LY′).

To prevent the light beams from being focused to too great a degree onto the photomultiplier, i.e., so that the intensity of the radiation which impinges on the photomultiplier is as uniform as possible, the shape of this surface is such that its outline in the sectional plane of the Figure is a series of parabolic segments rather than a succession of arcs of circles.

FIG. 4 shows an embodiment of this kind in which the arcs of circles are replaced by parabolic arcs and in which the photomultiplier does not occupy an oblique position but is orthogonal to the direction of the beam X. The segment BK is now an arc of a parabola whose axis is AB, whose focus is A and whose apex B is situated at the entry face BD of the crystal. The second segment KL is an arc of a parabola whose axis is AC, whose focus is C and whose apex k is situated in the plane KC. Point L is situated in the plane of surface CD. It can be seen as before that, as shown by the path of the rays issuing from a point M anywhere on surface AB, the rays travel to the photomultiplier without re-entering the crystal either after one reflection along a path MT"U, or after two reflections along a path MTT'S. Similarly, rays emitted from a point anywhere on faces CD and AC impinge on the photomultiplier either directly or after reflection.

The dimensions of the coupler depend on those of the scintillator crystal. In effect, taking the example of the two parabolas above:

$$AK = 2AB$$

and $$CL = 2AC + 2AK = 2AC + 4AB$$

and so that the exit diameter of the coupler is $$DL = 5AB + 2AC$$

The photomultiplier is so arranged as to receive the light flux emerging from plane DL of the coupler. It is preferably not bonded directly to this plane but is connected to it by a cylinder and possibly by a truncated cone which are intended to compensate for the difference in size between the photomultiplier and the plane DL.

It can be seen that with this arrangement and leaving aside absorption, the photomultiplier receives the light which emerges from the four faces of the crystal, it being understood that the reflective layer on face BD reflects light toward the interior and the other faces of the crystal.

Difficulties may arise in machining the parabolic surfaces BK and KL. To avoid these difficulties, in a modified form of the invention, the parabolic surfaces are replaced by a number of planes. Five of these are shown in FIG. 4. Planes BP and LR are tangent to respective ones of the parabolic arcs. Plane PK' is such that its normal at point P does not intersect faces AB, so that, as explained above, light emitted from any point on it is reflected clear of the crystal. Similarly, the normals of plane K'Q at point K' and of planes QR and RL at points Q and R pass clear of the crystal.

FIGS. 5 and 6 are a cross section and a view from above of a detecting head comprising a crystal 1, a coupler 3, and a photomultiplier 2. The reflective surfaces, which surround three faces of the crystal, are part-cylindrical surfaces whose directrix lies parallel to the crystal and whose generatrix is formed by the two parabolic arcs BK and KL. This part-cylindrical surface is bounded by two planes 6 and 7 parallel to the beam X which pass through the ends of the crystal. The entry face of the photomultiplier 2 is circular and it is connected to the coupler 3, which is of rectangular cross section, by a truncated cone 8 which connects up with a parallelepiped whose outline in FIG. 3 is represented by a rectangle DLVW. The intersection of the surface of the cone 8 with planes 6 and 7 defines a hyperbolic segment VW.

Depending upon the respective dimensions of the crystal 1 and the photomultiplier 2, this truncated connecting cone 8 may be either a cylinder or a truncated cone orientated in the opposite direction from that which is shown in FIG. 5.

The photomultiplier 2 is connected by a collar 9 to the truncated cone 8, which terminates in a cylindrical portion 11.

FIGS. 7 and 8 show, from the front and from above, a kind of detector in which the entry window of the photomultiplier 5 is circular and of a diameter slightly greater than the length of the crystal 1. The reference numerals and letters refer to the same items as in previous FIGURES. It can be seen that the planes 6 and 7 which form the boundaries of the collector continue directly to the entry window of the photomultiplier 2.

The crystal 1 is bonded into its seating in the collector whereas the photomultiplier is pressed resiliently against the collector via a transparent liquid. The refractive indices of the material of the collector on the one hand and of the adhesive used for the crystal and of the transparent liquid on the other hand are selected, as was stated above, so that the maximum amount of light crosses the interfaces.

In a preferred embodiment, the crystal is of oxygen-doped zinc telluride. The dimensions given are in millimeters.

Length EF = 20
Breadth AC = 2.5
Thickness AB = 1.2 which means:

Thickness of the collector DL = 11.

The collector is made of polymethymethacrylate, the adhesive used to attach the crystal to the collector is an optical adhesive, while the optical joint between the collector and the photomultiplier is a transparent silicone jelly of suitable refractive index.

An advantage of the last modification described in which the diameter of the photomultiplier is greater than the size of the crystal is that it enables a plurality of detectors to be juxtaposed crystal against crystal, two adjoining photomultipliers being offset angularly from one another.

FIG. 9 shows an assembly of two detectors whose crystals 1 are parallel and placed side-by-side. It can be seen that the size of the photomultipliers 2 is greater than that of the crystals and that for this reason they could not be placed side-by-side without the crystals 1 being spaced apart.

So that the measurements made by a detector do not affect those made by the adjoining detector, the crystals 1 and parts of the collectors 3 in contact are separated by a screen 11 which is impermeable to x-rays. This is a sheet of lead or tantalum approximately 0.5 mm thick.

What is shown in the example of FIG. 9 is an assembly of two detectors whose photomultipliers are orthogonal to the x-ray beam, but it is understood that the photomultipliers may be obliquely positioned at different angles and that the assembly may comprise any number of detectors, the photomultipliers being offset angularly from one another.

FIG. 10 shows a radiology apparatus which employs this kind of detector. It includes a support 12, to which a rotary movement may be imparted relative to its fixed framework (not shown) by means of a set of roller 13.

Slideways are used to attach to the support 12 a frame 15 which is able to move in translation relative to the support 12 between the extreme positions which are indicated in the Figure by broken lines. An opening 14 formed in the frame-work 15 enables the body 6 for examination, which is secured to the framework (not shown). to be placed in position. To the frame 15 are attached: an x-ray source 17, a primary collimator 18 for the beam, a secondary collimator 19, and a group of detectors 21, which are positioned in line with the x-ray beam 22. In the present case the group of detectors 21 is as shown in FIG. 9 and consists of two detectors having orthogonal photomultipliers with adjoining crystals, the line on which the crystals lie being perpendicular to the scanning plate defined by the plane of the support 12.

The apparatus enables two tomographic examinations to be performed simultaneously, each corresponding to the plane defined by the direction of the beam and the axis of translation of each crystal. It can be seen that the separation between the sectional planes is restricted only by the size of the crystals and not by that of the photomultipliers. The distance between the sections may be as low as 20 mm in the present case. Since the diameter of the photomultipliers is approximately 80 mm, this would have been the size of the minimum separation if the photomultipliers had been situated on the axis of the x-ray beam. It can also be seen that with this latter arrangement the size of the frame 15 would have been considerably greater.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the United States is:

1. A radiation detector, especially for X-radiation, which includes a scintillator crystal disposed to receive from a source a beam of X-radiation having a given direction at one part thereof; a light collector made from a material transparent to light detectable by a photomultiplier tube; a photomultiplier tube, disposed in association with said light collector to receive therefrom at least a portion of the light emitted by said scintillator crystal, the exterior surface of said light collector being provided with a reflecting layer constituting a reflecting surface for reflecting said light back into said light collector and in which the improvement comprises:
   said light collector surrounds substantially the entirety of said scintillator crystal except for that part of its surface exposed to said X-radiation;
   said reflecting surface of said light collector is so shaped that its intersection with a plane defined jointly by said direction of said beam of X-radiation and by the central axis of said photomultiplier is a curve whose evolute is tangent or external to said scintillator crystal.

2. A radiation detector as defined by claim 1, wherein said scintillation crystal is a right cylinder with polygonal base, the axis of said cylinder being substantially perpendicular to said plane defined by said beam direction and by said photomultiplier axis; whereby said scintillation crystal is a polyhedron one face of which is exposed to said beam of radiation while the remaining faces are surrounded by said collector.

3. A radiation detector as defined by claim 2, wherein said collector is so shaped that the intersection of said reflecting surface with said plane defined by said beam direction and by said photomultiplier axis is a composite curve, composed of connected segments of curves, each of said segments corresponding with one face of said scintillation crystal, and so disposed that each segment receives the direct light from the corresponding face of said crystal and also receives the light reflected from an adjacent segment and wherein each segment reflects the light either into the photomultiplier or onto an adjacent segment.

4. A radiation detector as defined by claim 3, wherein said segments are arcs of circles, the center of each circle lying on that edge of the corresponding face of said crystal which is remote from the source of said beam of radiation, one end of each segment lying in the plane of said corresponding face, and the length thereof being a minimum length determined, respectively, either by the plane of the adjacent face or by the location of the photomultiplier, and wherein a particular segment which corresponds to a crystal face which lies adjacent to a crystal face receiving X-radiation passes through the edge of the crystal opposite to that edge in which the center of the particular circle is located, whereas the circular arcs defining the segments corresponding to the remaining faces of said crystal pass through the end of an adjacent circular arc.

5. A radiation detector as defined by claim 3, wherein said segments are arcs of parabolas, the focus of each parabola lying on that edge of the corresponding face of said crystal which is remote from the source of said beam of radiation, the axis of each parabola lying in the plane of said corresponding face of said crystal, one end of each segment lying in the plane of the corresponding face, and the length of each parabolic arc being a minimum length, determined, respectively, either by the plane of the adjacent face or the location of the photomultiplier, and wherein the apex of each parabolic arc corresponding to a crystal face which lies adjacent to a crystal face receiving X-radiation passes through the edge of the crystal opposite to that edge in which the focus of the particular parabola is located, whereas the parabolic arcs corresponding to the remaining faces of said crystal pass through the end of an adjacent parabolic arc.

6. A radiation detector as defined by claim 3, wherein said segments of curves are at least partly constituted by at least one straight line so located that normals to said straight line lie exteriorly of said crystal in the majority of cases.

7. A radiation detector as defined by claim 1, wherein said scintillation crystal is a right cylinder with polygonal base, the axis of said cylinder being substantially perpendicular to said plane defined by said beam direction and by said photomultiplier axis; and wherein said collector has two flat sides which are parallel to said beam of X-radiation and which also pass through end portions of said crystal.

8. A radiation detector as defined by claim 1, wherein said scintillator crystal is comprised of oxygen-doped zinc telluride.

9. A radiation detector as defined by claim 1, wherein said collector is made from polymethylmethacrylate.

10. A radiological apparatus for examination of an object by means of X-rays, comprising a source of x-radiation and a plurality of radiation detectors, each of which includes a scintillator crystal disposed to receive from said source a beam of X-radiation having a given direction at one part thereof; a light collector made from a material transparent to light detectable by a photomultiplier tube; a photomultiplier tube, disposed in association with said light collector to receive therefrom at least a portion of the light emitted by said scintillator crystal, the exterior surface of said light collector being provided with a reflecting layer constituting a reflecting surface for reflecting said light back into said light collector and in which the improvement comprises:

said light collector surrounds substantially the entirety of said scintillator crystal except for that part of its surface exposed to said X-radiation;

said reflecting surface of said light collector is so shaped that its intersection with a plane defined jointly by said direction of said beam of X-radiation and by the central axis of said photomultiplier is a curve whose evolute is tangent or external to said scintillator crystal.

* * * * *